(12) United States Patent
Ancimer et al.

(10) Patent No.: US 12,458,913 B2
(45) Date of Patent: Nov. 4, 2025

(54) MULTI-STAGE FILTRATION SYSTEM FOR FUEL CELL HYBRID PROPULSION SYSTEM

(71) Applicant: Cummins Inc., Columbus, IN (US)

(72) Inventors: Richard J. Ancimer, Toronto (CA); Joseph P. Chandraraj, Columbus, IN (US); David P. Genter, Columbus, IN (US); Brian K. Landes, Seymour, IN (US); Agneya Turlapati, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 385 days.

(21) Appl. No.: 18/136,220

(22) Filed: Apr. 18, 2023

(65) Prior Publication Data

US 2024/0157277 A1    May 16, 2024

Related U.S. Application Data

(60) Provisional application No. 63/332,574, filed on Apr. 19, 2022.

(51) Int. Cl.

| | |
|---|---|
| *B01D 35/143* | (2006.01) |
| *B01D 24/00* | (2006.01) |
| *B01D 25/00* | (2006.01) |
| *B01D 29/56* | (2006.01) |
| *B01D 46/58* | (2022.01) |
| *B01D 46/62* | (2022.01) |

(Continued)

(52) U.S. Cl.
CPC ....... *B01D 35/1435* (2013.01); *B01D 24/008* (2013.01); *B01D 25/006* (2013.01); *B01D 25/007* (2013.01); *B01D 46/62* (2022.01); *H01M 8/0662* (2013.01); *H01M 8/0687* (2013.01); *B01D 46/0027* (2013.01); *B01D 46/58* (2022.01); *B01D 2253/102* (2013.01); *B01D 2257/708* (2013.01); *B01D 2265/023* (2013.01); *B01D 2265/027* (2013.01); *B01D 2311/246* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 4,681,604 | A | 7/1987 | Niederer |
| 8,562,913 | B2 | 10/2013 | Searle |

(Continued)

FOREIGN PATENT DOCUMENTS

| | | |
|---|---|---|
| CN | 204767887 U | 11/2015 |

*Primary Examiner* — Gabriel E Gitman
(74) *Attorney, Agent, or Firm* — Foley & Lardner LLP

(57) ABSTRACT

A filtration system for a fuel cell hybrid propulsion system includes a first stage filter, a second stage filter positioned downstream of the first stage filter, and a third stage filter positioned downstream of the second stage filter and configured to be positioned upstream of a fuel cell system. The first stage filter has first pores with a first mean pore size. The second stage filter has second pores with a second mean pore size. The third stage filter has third pores with a third mean pore size. The second mean pore size is less than the first mean pore size. The third mean pore size is less than or equal to the second mean pore size. The first, second, and third stage filter are structured to filter an airflow prior to being received by the fuel cell system.

20 Claims, 7 Drawing Sheets

(51) Int. Cl.
*H01M 8/0662* (2016.01)
*B01D 46/00* (2022.01)

(56) References Cited

U.S. PATENT DOCUMENTS

| | | | |
|---|---|---|---|
| 8,882,874 B1* | 11/2014 | Cross | B01D 53/0407 |
| | | | 55/482 |
| 9,214,691 B2 | 12/2015 | Gottesfeld | |
| 9,649,584 B2 | 5/2017 | Burns et al. | |
| 10,220,343 B2 | 3/2019 | Baek et al. | |
| 10,770,741 B2 | 9/2020 | Matsuno | |
| 2010/0003555 A1 | 1/2010 | Mori et al. | |
| 2010/0162888 A1* | 7/2010 | Blucher | B01J 20/165 |
| | | | 96/135 |
| 2010/0255385 A1* | 10/2010 | Wolf | H01M 12/08 |
| | | | 361/679.01 |
| 2015/0059583 A1* | 3/2015 | Cornell | B01D 46/71 |
| | | | 96/414 |
| 2017/0239604 A1* | 8/2017 | Baek | H01M 8/0687 |
| 2022/0082267 A1* | 3/2022 | Schrock | A61L 9/014 |

* cited by examiner

MULTI-STAGE FILTRATION SYSTEM FOR FUEL CELL HYBRID PROPULSION SYSTEM

CROSS-REFERENCE TO RELATED PATENT APPLICATION

This application claims the benefit of and priority to U.S. Provisional Patent Application No. 63/332,574, filed Apr. 19, 2022, which is incorporated herein by reference in its entirety.

TECHNICAL FIELD

The present disclosure relates to a multi-stage filtration system for a fuel cell hybrid propulsion system, and in particular, a three-stage filtration system for a fuel cell hybrid propulsion system.

BACKGROUND

Fuel cell hybrid propulsion systems for vehicles and machines can be more susceptible to degradation when exposed to dirty or unclean air as compared to traditional internal combustion propulsion systems and associated internal combustion hybrid propulsion systems. Specifically, both particles in the air (e.g., dirt, metal dust, etc.) and chemicals in the air (e.g., ozone, carbon dioxide, carbon monoxide, sulfur compounds, formaldehyde, ammonia, hydrogen sulfide, nitrogen oxides, Benzene, Toluene, etc.) can cause accelerated degradation of a fuel cell within a fuel cell hybrid propulsion system. Such particles and chemicals may be abundant in a variety of applications, including mining, construction, agriculture, marine, and locomotive applications. As the fuel cell degrades due to chemical poisoning and/or particulate buildup, the fuel cell starts to burn an increasing amount of fuel (e.g., hydrogen) to produce electricity and provide the same power output. Therefore, chemical poisoning and particulate buildup in a fuel cell can significantly impact the efficiency of the fuel cell to produce electricity, the useful life of the fuel cell, and the amount of downtime of the vehicle or machine, all of which increase the cost of maintaining and operating the vehicle or machine.

SUMMARY

One embodiment relates to a system for a fuel cell hybrid propulsion system. The system includes a filtration assembly, a plurality of pressure sensors, one or more chemical sensors, and a controller. The filtration assembly includes a first stage filter having first pores with a first mean pore size, a second stage filter positioned downstream of the first stage filter and having second pores with a second mean pore size, and a third stage filter positioned downstream of the second stage filter and configured to be positioned upstream of a fuel cell assembly. The third stage filter having third pores with a third mean pore size. The second mean pore size is less than the first mean pore size. The third mean pore size is less than or equal to the second mean pore size. The first stage filter, the second stage filter, and the third stage filter are structured to filter an airflow prior to being received by the fuel cell assembly. The plurality of pressure sensors positioned to acquire pressure data regarding a pressure differential across at least one of the first stage filter or the second stage filter. The one or more chemical sensors are positioned to acquire chemical data regarding at least one of a presence, a quantity, or a type of chemical downstream of at least one of the first stage filter or the second stage filter. The controller has programmed instructions to monitor the pressure data and the chemical data, provide a first notification in response to the pressure data indicating that at least one of the first stage filter or the second stage filter is in a plugged condition, and provide a second notification in response to the chemical data indicating that at least one of the first stage filter or the second stage filter is chemically saturated.

Another embodiment relates to a system for a machine having a fuel cell hybrid propulsion system. The system includes a filtration assembly, a plurality of pressure sensors, one or more chemical sensors, and a controller. The filtration assembly includes a plurality of filter stages including at least a first stage filter having a first mean pore size and a second stage filter having a second mean pore size less than the first mean pore size. At least one of the first stage filter or the second stage filter includes a chemical catalyst to react with one or more chemicals. The plurality of pressure sensors are positioned to acquire pressure data regarding a first pressure differential across the first stage filter and a second pressure differential across the second stage filter. The one or more chemical sensors are positioned to acquire chemical data regarding a chemical downstream of at least one of the first stage filter or the second stage filter. The controller has programmed instructions to monitor the pressure data and the chemical data, provide a first notification in response to the first pressure differential indicating that the first stage filter is in a plugged condition, provide a second notification in response to the second pressure differential indicating that the second stage filter is in the plugged condition, and provide a third notification in response to the chemical data indicating that the chemical catalyst is chemically saturated.

Still another embodiments relates to a system for a machine having a fuel cell hybrid propulsion system. The system includes a filtration assembly, an air inlet, an onboard air storage, a battery, and a controller. The filtration assembly is configured to be positioned upstream of a fuel cell assembly. The filtration assembly includes a plurality of filter stages. The air inlet is positioned upstream of the filtration assembly. The air inlet is selectively closable or restrictable. The onboard air storage is configured to store an air supply and facilitate selectively providing the air supply to the filtration assembly or the fuel cell assembly. The battery is configured to provide power to an electric motor of the machine. The controller has programmed instructions to acquire air quality data regarding an air quality of air upcoming, proximate, or entering the air inlet, close or restrict the air inlet in response to the air quality data indicating that the air upcoming, proximate, or entering the air inlet is of a quality lower than a quality threshold to prevent dirty ambient air from entering the filtration assembly, activate the onboard air storage to provide the air supply to the filtration assembly or the fuel cell assembly when the air inlet is closed or restricted, and provide power to the electric motor using the battery when the air inlet is closed or restricted and the onboard air storage is empty.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Following below are more detailed descriptions of various concepts related to, and implementations of, a multi-stage filtration system for a fuel cell hybrid propulsion system. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the figures generally, the various embodiments disclosed herein relate to a multi-stage (e.g., a three-stage) filtration system for a fuel cell hybrid propulsion system. The multi-stage filtration system is structured to filter particulates and chemicals from air prior to the air being provided to a fuel cell assembly of the fuel cell hybrid propulsion system. In operation, the multi-stage filtration system is structured to progressively filter out smaller and smaller particles and substantially prevent particles and chemicals from passing through and entering into the fuel cell, thereby mitigating chemical poisoning and particulate buildup within the fuel cell and extending the useful life thereof. In some embodiments, the multi-stage filtration system includes various sensors (e.g., pressure sensors, chemical sensors, etc.) that facilitate actively monitoring status of the multi-stage filtration system to take active preventative action (e.g., open/close one or more air intakes, activate an on-board air supply, during an excessively dirty air condition, etc.) and/or schedule service or notify maintenance is required. For example, the multi-stage filtration system may include three stages of filtration. When the first and second stages have been breached by chemical debris, the third stage can catch passing chemical debris before it poisons the fuel cell. Because the rate of chemical debris passing a respective filter stage may be very abrupt in some cases, much warning may not be provided to the operator that a filter change is required due to expiration of the second stage filter. The third or "last chance" filter, in this example embodiment, enables time to complete the current mission before the chemical debris begins passing into the fuel stack, and then the filters can be changed as needed following an alert that the first stage and second stage filters have been breached. The third stage filter is, therefore, structured (e.g., designed, configured, etc.) to catch debris between the time that the sensors identify that the upstream filter stages have been breached to the time the filters stages are able to be replaced with new filters or cleaned.

Figure 1:
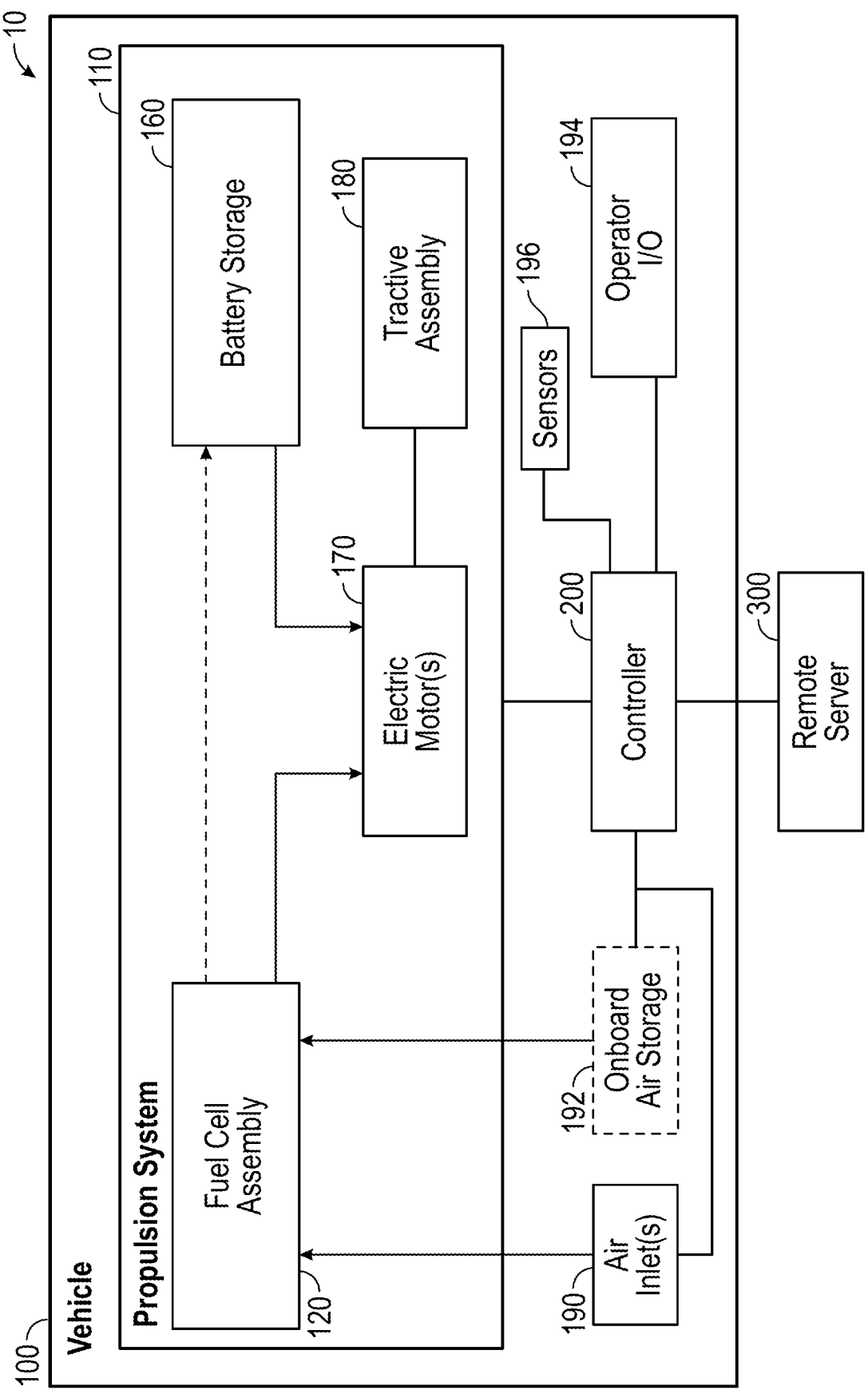
FIG. 1 is a schematic diagram of a vehicle system including a vehicle having a fuel cell hybrid propulsion system and a controller, according to an exemplary embodiment.

As shown in FIG. 1, a system, shown as vehicle system 10, includes a vehicle or machine, shown as vehicle 100, and a server, shown as remote server 300. The vehicle 100 includes a driveline, shown as fuel cell hybrid propulsion system 110, one or more air inlets, shown as air inlet(s) 190, an air or oxygen storage system, shown as onboard air storage 192, an operator input/output ("I/O") device, shown as operator I/O 194, and a vehicle control system, shown as controller 200. The fuel cell hybrid propulsion system 110 includes a fuel cell assembly, shown as fuel cell assembly 120, energy storage, shown as battery storage 160, one or more prime movers, shown as electric motor(s) 170, and a tractive system, shown as tractive assembly 180.

As a general overview of the fuel cell hybrid propulsion system 110, the fuel cell assembly 120 is structured to perform an electrochemical reaction using oxygen and hydrogen to produce electricity. The generated electricity may be provided to the battery storage 160 to charge the battery storage 160, to the electric motor(s) 170 to power the electric motor(s) 170, and/or to electrically operated accessories of the vehicle 100 (e.g., pumps, fans, lights, displays, etc.). The battery storage 160 may be charged via the fuel cell assembly 120, solar panels positioned along an exterior of the vehicle 100, and/or an external power source (e.g., a mains power source, via a charging port, etc.). The electric motor(s) 170 is (are) structured to receive electricity from the fuel cell assembly 120 and/or the battery storage 160 to drive the tractive assembly 180. In one embodiment, the fuel cell hybrid propulsion system 110 includes a single electric motor 170. In another embodiment, the fuel cell hybrid propulsion system 110 includes a plurality of electric motors 170. The tractive assembly 180 is structured to receive a mechanical input from the electric motor(s) 170 to drive the vehicle 100. The tractive assembly 180 may include a variety of components depending upon the application of the vehicle 100. By way of example, the tractive assembly 180 may include components such as drive shafts, differentials, transfer cases, axles, wheels, track elements, propellers, etc.

According to an exemplary embodiment, the air inlet(s) 190 and/or the onboard air storage 192 are structured to provide air or oxygen to the fuel cell assembly 120 to facilitate operation of the fuel cell assembly 120, as described in greater detail herein. In one embodiment, the vehicle 100 includes a single air inlet 190 and does not include the onboard air storage 192. In another embodiment, the vehicle 100 includes a plurality of air inlets 190 and does not include the onboard air storage 192. By way of example, a first air inlet 190 may be positioned at or proximate a front of the vehicle 100 and a second air inlet 190 may be otherwise positioned (e.g., at or proximate a side of the vehicle 100, at or proximate a rear of the vehicle 100, etc.). In such an embodiment, the first air inlet 190 or the second air inlet 190 may be selectively closed or restricted (e.g., via a valve, a movable baffle or shutter, based on where dirty air and clean air may be present about the vehicle 100, etc.) to prevent dirty ambient air (e.g., ambient air with metal dust particles, dirt particles, chemicals, exhaust fumes from proximate vehicles, etc.) from entering the fuel cell assembly 120. In yet another embodiment, the vehicle 100 includes one or more air inlets 190 and the onboard air storage 192. In such an embodiment, the one or more air inlets 190 may be selectively closed or restricted (e.g., via a valve, a movable baffle or shutter, etc.) to prevent dirty ambient air from entering the fuel cell assembly 120 and, instead, air or oxygen stored in the onboard air storage 192 may be provided to the fuel cell assembly 120 by the onboard air storage 192. In one embodiment, the onboard air storage 192 includes a tank and a compressor that is structured to fill or charge the tank with ambient air (e.g., when clean air is available around the vehicle 100, as the vehicle 100 is moving and/or stationary, etc.). In another embodiment, the onboard air storage 192 includes a tank that is structured to be pre-filed or pre-charged with air or oxygen from an off-vehicle filling source (e.g., an external air compressor, an external oxygen source, when the vehicle 100 is at a filling station, etc.).

The operator I/O 194 may enable an operator of the vehicle 100 to communicate with the vehicle 100 and the controller 200 or vice versa. By way of example, the operator I/O 194 may include, but is not limited to, an interactive display, a touchscreen device, one or more buttons, one or more switches, one or more dials, voice command receivers, warning lamps/indicators, and the like. In one embodiment, the operator I/O 194 includes a brake pedal or a brake lever, an accelerator pedal or an accelerator throttle, and/or control joysticks.

The vehicle 100 may include various sensors 196 (e.g., cameras, chemical sensors, oxygen sensors, air quality sensors (e.g., particulate matter sensors, NOx sensors, etc.), pressure sensors, temperature sensors, fluid flow rate sensors, battery sensors, etc.) strategically positioned in/around the vehicle 100 and/or outside of the vehicle 100 to facilitate monitoring characteristics of the vehicle 100 and the components thereof (e.g., the fuel cell assembly 120, the battery storage 160, fuel levels, filter health, state of charge, etc.) and/or monitor external conditions around the vehicle 100 (e.g., chemicals in the air, pollutants in the air, debris/dirt in the air, air quality, upcoming terrain such as tunnels, etc.).

Figure 2:
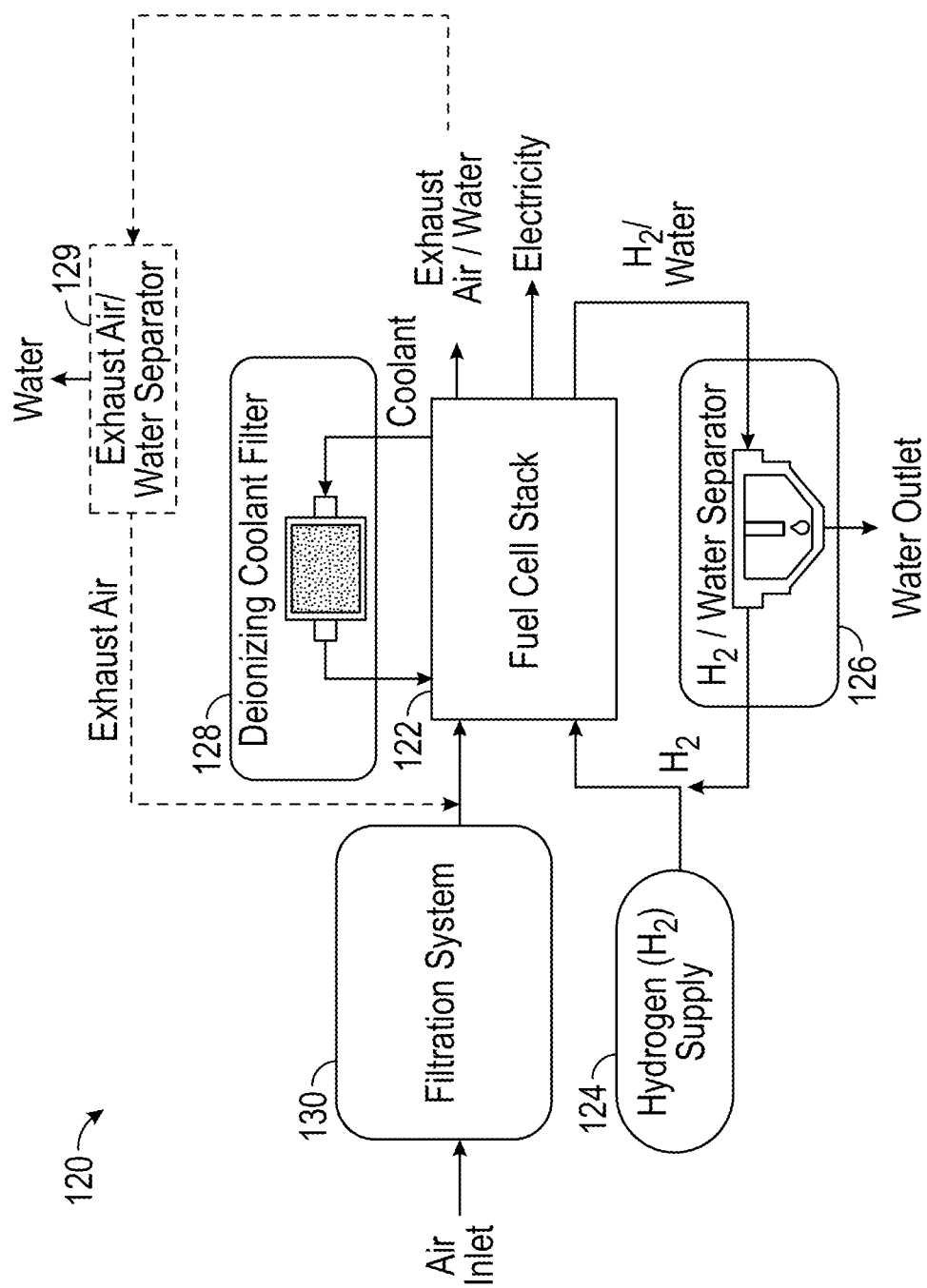
FIG. 2 is a schematic diagram of a fuel cell assembly of the fuel cell hybrid propulsion system of FIG. 1 including a filtration system, according to an exemplary embodiment.

As shown in FIG. 2, the fuel cell assembly 120 includes a fuel cell, shown as fuel cell stack 122, a fuel supply, shown as hydrogen supply 124, a first separator (e.g., a water condenser), shown as hydrogen/water separator 126, a coolant filter, shown as deionizing coolant filter system 128, a second separator (e.g., a water condenser), shown as exhaust air/water separator 129, and a first filter assembly, shown as filtration system 130. In some embodiments, the fuel cell assembly 120 does not include the exhaust air/water separator 129.

The hydrogen supply 124 is structured to store hydrogen and provide the hydrogen to the fuel cell stack 122. The filtration system 130 is structured to (i) receive air from the air inlet(s) 190 and/or the onboard air storage 192 and (ii) provide filtered air to the fuel cell stack 122. In some embodiments, the onboard air storage 192 independently filters the air (when charging or self-filling) or receives filtered air or pure oxygen (from a filling source). In such embodiments, the fuel cell stack 122 may receive the filtered air or pure oxygen directly from the onboard air storage 192 (in place of or to supplement the filtered air received from the filtration system 130).

The fuel cell stack 122 is structured to perform an electrochemical reaction using the hydrogen and the filtered air/oxygen, which (i) produces electricity that can be provided to the battery storage 160, the electric motor(s) 170, and/or electrically operated accessories of the vehicle 100, (ii) produces a hydrogen/water mixture that is provided to the hydrogen/water separator 126, (iii) generates heat which is managed by the deionizing coolant filter system 128, and (iv) produces exhaust containing the filtered air and water that is expelled to the surrounding environment or provided to the exhaust air/water separator (if included with the fuel cell assembly 120). In the example shown, the fuel cell stack 122 may be structured as a proton-exchange membrane (PEM) fuel cell. The hydrogen/water separator 126 is structured to remove the water from the hydrogen/water mixture, expel the water via a water outlet, and recirculate the remaining hydrogen back to the fuel cell stack 122. The deionizing coolant filter system 128 is structured to circulate coolant through the fuel cell stack 122 to thermally regulate the fuel cell stack 122 and remove ions (cations and anions) that build in the coolant as the coolant circulates through the fuel cell stack 122, which prevents a short circuit event from occurring between the cells of fuel cell stack 122. The exhaust air/water separator 129 is structured to remove the water from the exhaust, expel the water via a water outlet, and recirculate the remaining exhaust air back to the fuel cell stack 122, which has already been filtered and, therefore, can bypass the filtration system 130.

Figure 3:
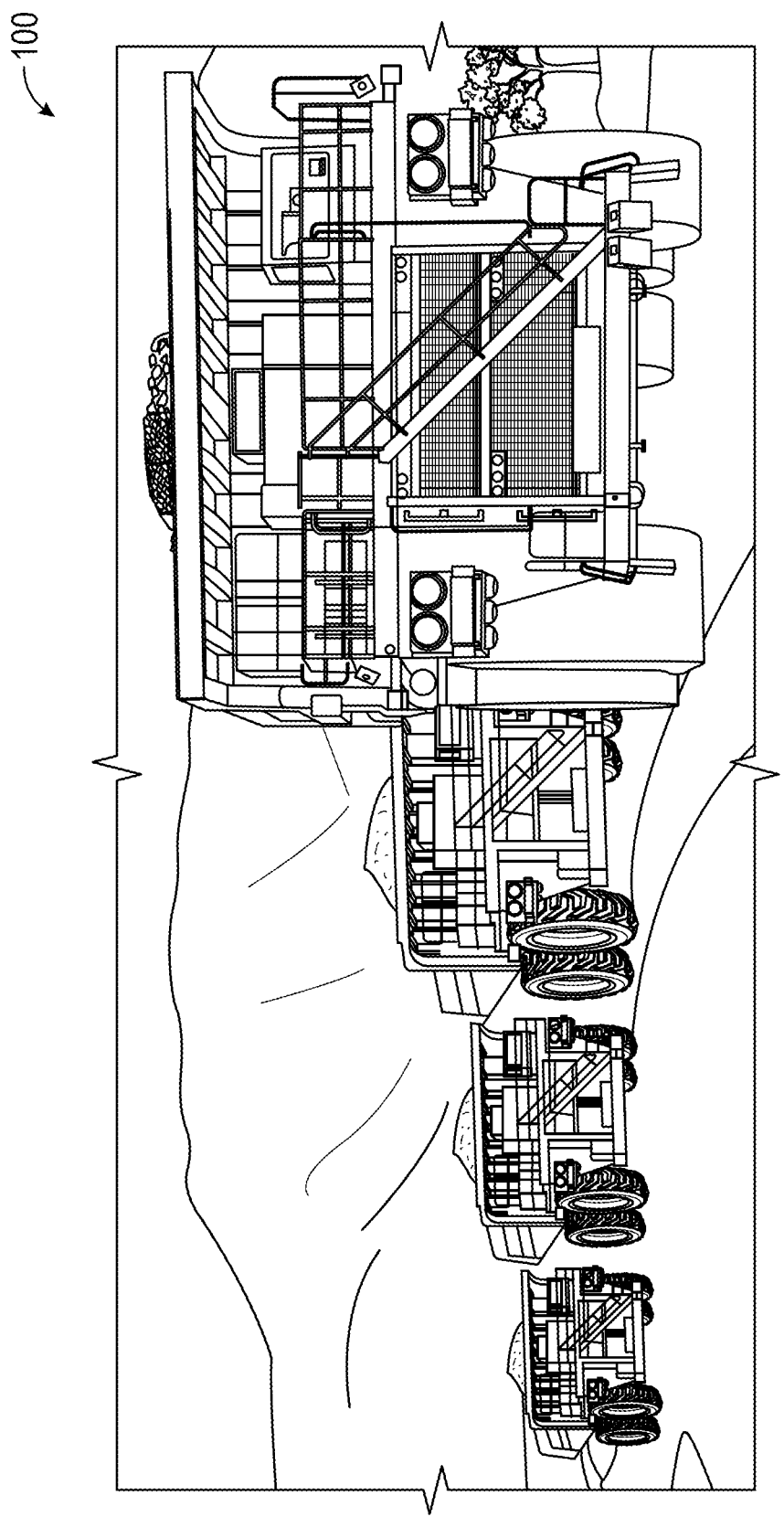
FIG. 3 is a perspective view of a vehicle of FIG. 1, according to an exemplary embodiment.
Figure 4:
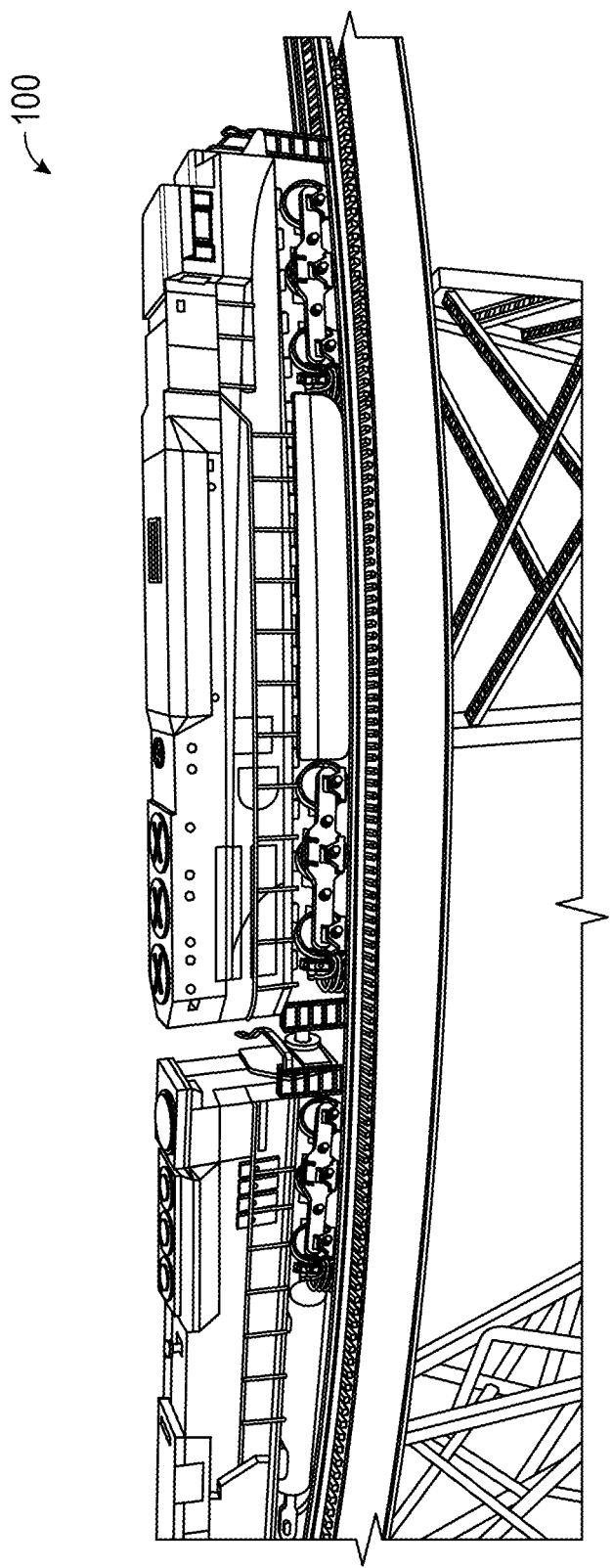
FIG. 4 is a perspective view of a vehicle of FIG. 1, according to another exemplary embodiment.

According to an exemplary embodiment, the vehicle 100 is an off-road vehicle. In many off-highway applications, the vehicle 100 may be operating in harsh conditions with various chemicals and particulates in the air and/or in a fleet with other engine systems (e.g., diesel engine systems) that may be potentially emitting chemicals that could harm the fuel cell stack 122. As shown in FIG. 3, the vehicle 100 is a mining vehicle (e.g., a mining haul truck, a mining digger, a mining loader, etc.). Mining vehicles are often used in harsh conditions with poor air quality for extended periods of time where metallic dust, dirt, and chemicals and exhaust gases (e.g., ozone, carbon dioxide, carbon monoxide, sulfur compounds, formaldehyde, ammonia, hydrogen sulfide, nitrogen oxides, Benzene, Toluene, diesel engine exhaust from proximate vehicles and/or machines, etc.) can be in abundance in the air. As shown in FIG. 4, the vehicle 100 is a locomotive (e.g., a train, a passenger train, a cargo train, etc.). Similarly, locomotives can be operated in areas of poor air quality (e.g., tunnels, in locomotive yards with diesel trains, a locomotive with a diesel engine driven car and a fuel cell hybrid driven car, etc.). For example, with a locomotive application, when the vehicle 100 is in a train yard, the fuel cell assembly 120 may be operating in close proximity to other lowly-emissionized applications/vehicles (e.g., 2-stroke diesels) that emit harmful chemicals and, when ingested by the fuel cell stack 122, can accelerate performance degradation. In some embodiments, the vehicle 100 is a different type of off-road vehicle (e.g., agricultural machinery, construction machinery, marine vehicles, etc.). In other embodiments, the vehicle 100 is an on-road vehicle (e.g., a semi-tractor, a truck, a passenger vehicle, a refuse vehicle, a concrete mixer vehicle, a response vehicle, etc.). In still other embodiments, the vehicle is a stationary machine, such as a power generator or genset.

Particles in the air (e.g., dirt, metal dust, etc.) and chemicals and exhaust gases in the air (e.g., ozone, carbon dioxide, carbon monoxide, sulfur compounds, formaldehyde, ammonia, hydrogen sulfide, nitrogen oxides, Benzene, Toluene, diesel engine exhaust from proximate vehicles and/or machines, etc.) can cause degradation of the fuel cell stack 122 and significantly impact the efficiency thereof to produce electricity. In addition, metallic particles (e.g., which can be especially prevalent in mining applications, copper, iron, etc.) can cause a "short" in the fuel cell stack 122. Therefore, the cleanliness of hydrogen and oxygen supplies to the fuel cell stack 122 is significant to the longevity of the fuel cell hybrid propulsion system 110, much more so than other type of propulsion systems (e.g., internal combustion engine based propulsion systems). Accordingly, the filtration system 130 of the fuel cell assembly 120 is structured and configured to provide improved filtration and monitoring capabilities to substantially mitigate chemical poisoning and particulate buildup within the fuel cell stack 122 and, thereby, substantially prevent or slow degradation of the fuel cell stack 122 while the vehicle 100 is used in poor air quality conditions that the vehicle 100 may be subjected to during extended operation periods. Therefore, the filtration system 130 of the present disclosure is structured to substantially maintain operating efficiency of the fuel cell stack 122, even when intensely operated in severe or harsh air quality conditions for a significant period of time (e.g., at least 6,000 hours of operation per year; up to 25,000 hours of operation over 3 years; etc.), which improves the useful life of the fuel cell stack 122 and decreases the amount of downtime of the vehicle 100, thereby, decreasing the cost of maintaining and operating the vehicle 100 and increasing the productivity and profitability of the vehicle 100. As described in greater detail herein, the filtration system 130 provides multiple stages of progressively tighter and tighter porous media that facilitate capturing both large and small particles, including metallic particles, while not overly restricting airflow therethrough so that that the filtration system 130 can capture such small particles while maintaining longevity of the filtration system 130 and maintaining sufficient airflow through the filtration system 130.

Figure 5:
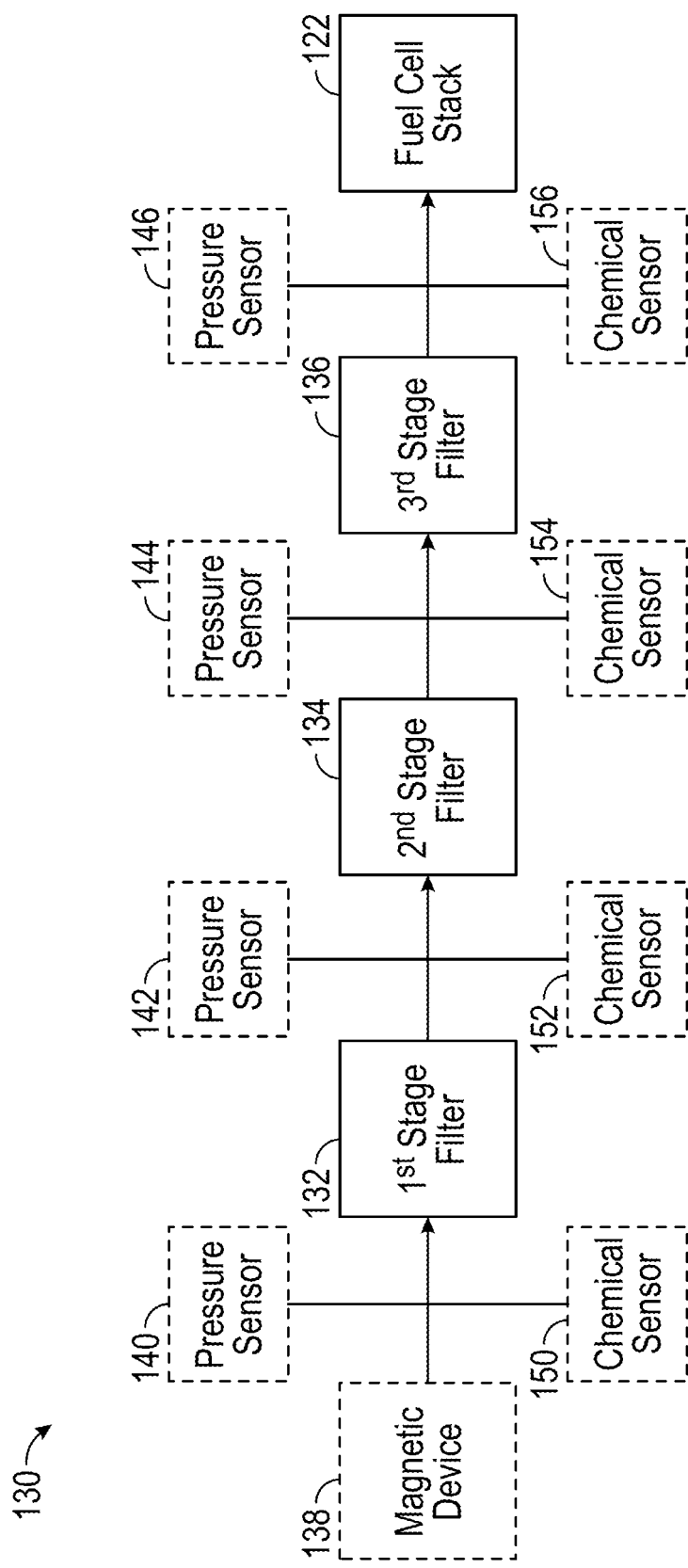
FIG. 5 is a schematic diagram of the filtration system of FIG. 2, according to an exemplary embodiment.

As shown in FIG. 5, the filtration system 130 includes a first filter, shown as first stage filter 132, a second filter, shown as second stage filter 134, and a third filter or "last chance" filter, shown as third stage filter 136. According to an exemplary embodiment, each of the first stage filter 132, the second stage filter 134, and the third stage filter 136 includes a filtration or porous media. The filtration or porous media may be constructed of a plurality of layers of porous material with or without a melt-blown layer. The filtration or porous media may function like a sieve or screen to prevent certain size particles from penetrating downstream thereof. The filtration or porous media may have a distribution of pore sizes ranging from "big" pores to "small" pores. Such distribution of pore sizes may be defined by a Mean Pore ("MP") size that describes the pore distribution of the filtration or porous media. The MP size may graduate down in size from the first stage filter 132 to the third stage filter 136 in such a way that excessive pressure drop does not exist when air is flowing through the filtration media with the smallest MP size (i.e., pressure drops above a certain predefined amount may be defined as "excessive").

According to an exemplary embodiment, (i) the first stage filter 132 is a coarse filter having first pores with a first MP size to facilitate filtering coarser or larger particles from incoming air, (ii) the second stage filter 134 is a first fine filter having second pores with a second MP size less than the first MP size to facilitate filtering finer or smaller particles from air that has been filtered through the first stage filter 132, and (iii) the third stage filter 136 is a second fine filter having third pores with a third MP size (a) less than the first MP size and (b) less than or equal to the second MP size to facilitate filtering finer or smaller particles from air that has been filtered through the first stage filter 132 and the second stage filter 134. In some embodiments, the third MP size is less than the second MP size. In some embodiments, the third MP size is substantially the same as the second MP size. By way of example, the first MP size may be about 40 microns (e.g., between 30 and 50 microns, between 35 and 45 microns, less than or equal to 40 microns, greater than 30 microns, etc.) and the second MP size may be about 10 microns (e.g., between 5 and 15 microns, between 8 and 12 microns, less than or equal to 10 microns, greater than 5 microns, etc.). In some embodiments, the second MP size and/or the third MP size is less than 5 microns.

In some embodiments, the first stage filter 132, the second stage filter 134, and/or the third stage filter 136 have a panel structure. In some embodiments, the first stage filter 132, the second stage filter 134, and/or the third stage filter 136 have a filter-in-filter canister design or arrangement. By way of example, the filter-in-filter canister design may have an outer filter stage (e.g., an outer cylindrical filter) and an inner filter stage (e.g., an inner cylindrical filter) disposed within the outer filter stage.

According to an exemplary embodiment, the first stage filter 132, the second stage filter 134, and/or the third stage filter 136 function as particulate and chemical filters. By way of example, the first stage filter 132, the second stage filter 134, and/or the third stage filter 136 may include a chemical catalyst, such as active carbon (e.g., an active carbon layer, an active carbon coating, active carbon impregnated within the filter structure/material/media, a separate chemical filtration media, a combined particulate and chemical filtration media, etc.), to react with and/or neutralize various chemicals (e.g., ozone, carbon dioxide, carbon monoxide, sulfur compounds, formaldehyde, ammonia, hydrogen sulfide, nitrogen oxides, Benzene, Toluene, etc.) that may be present in the incoming air as a result of the processes or environment the vehicle 100 is involved in (e.g., mining, construction, agriculture, locomotive, marine, etc.) and/or exhaust emissions of proximate vehicles (e.g., in a train yard, in a mine, following an internal combustion engine vehicle, in a tunnel, in a harbor, etc.). In one embodiment, each of the first stage filter 132, the second stage filter 134, and the third stage filter 136 is a particulate and chemical filter. In another embodiment, two of the first stage filter 132, the second stage filter 134, and the third stage filter 136 are particulate and chemical filters (e.g., the second stage filter 134 and the third stage filter 136, the first stage filter 132 and the third stage filter 136, the first stage filter 132 and the second stage filter 134, etc.). By way of example, the first stage filter 132 and the second stage filter 134 may perform both particulate and chemical filtration, while the third stage filter 136 may only perform chemical filtration.

According to an exemplary embodiment, the progressive, multi-stage filtering provided by the filtration system 130 facilitates progressively filtering out smaller and smaller particles and substantially preventing particles and chemicals from passing through and entering into the fuel cell stack 122, thereby mitigating chemical poisoning and particulate buildup within the fuel cell stack 122 and extending the useful life thereof. However, over time, (i) each filter stage may eventually become plugged beyond a desired level with particles and start to restrict airflow therethrough and/or (ii) the catalyst thereof may become saturated such that the chemical neutralization capacity of the catalyst decreases and chemicals start to pass therethrough. At such time intervals, one or more of the first stage filter 132, the second stage filter 134, and the third stage filter 136 may require servicing.

According to an exemplary embodiment, each of the first stage filter 132, the second stage filter 134, and the third stage filter 136 is individually and selectively serviceable (e.g., replaceable, washable, catalyst regeneration processes performed thereon, etc.). According to an exemplary embodiment, the first stage filter 132 and the second stage filter 134 are structured (e.g., designed, configured, etc.) such that a substantial majority of particles and chemicals within incoming air are filtered and/or neutralized from the incoming air before reaching the third stage filter 136 (i.e., the filter that removes the particles from the air can also have active carbon layers that remove at least some of the chemical debris such that, in some embodiments, a single filter performs multiple functions). The useful life of the third stage filter 136 may, therefore, be significantly longer than the first stage filter 132 and the second stage filter 134, and the timing between required servicing of the third stage filter 136 may be significantly longer than that of the first stage filter 132 and the second stage filter 134. By way of example, the useful life and/or required timing for servicing of the third stage filter 136 may be 5-10 times longer than that of the first stage filter 132 and the second stage filter 134. As a result, the third stage filter 136 can remain in place when servicing the first stage filter 132 and/or the second stage filter 134, which will prevent or substantially prevent particles and/or chemicals from entering the fuel cell stack 122 when the filtration system 130 is open during such a servicing event. Therefore, servicing of the first stage filter 132 and the second stage filter 134 can be performed in the field in the presence of dirty air contaminated with particles and/or chemicals without the consequence of the dirty air entering the fuel cell stack 122, thereby saving time and increasing up time of the vehicle 100 by preventing the need to send the vehicle 100 to a service bay for maintenance to service the first stage filter 132 and/or the second stage filter 134. When servicing the third stage filter 136, such servicing can be performed in a location without or substantially without particle and/or chemical contamination concerns. By way of example, servicing of the third stage filter 136 may align with other maintenance that would typically occur in cleaner conditions (e.g., more substantial servicing events that require going into a servicing bay, etc.).

As shown in FIG. 5, the filtration system 130 includes a magnetic element (e.g., a magnetic material, an electromagnetic device, etc.), shown as magnetic device 138. The magnetic device 138 may be structured and/or configured to attract metallic particles (e.g., metal dust, iron dust, nickel dust, cobalt dust, gadolinium dust, etc.) that may be present in the incoming air. The magnetic device 138 may, therefore, be positioned upstream of the first stage filter 132, the second stage filter 134, and the third stage filter 136 to prevent such metallic particles from engaging with the first stage filter 132, the second stage filter 134, or the third stage filter 136 (e.g., prolonging the useful life thereof, etc.). In some embodiments (e.g., in applications where metallic particles may not be prevalent), the filtration system 130 does not include the magnetic device 138.

The sensors 196 of the vehicle 100 may include a plurality of filtration system sensors positioned throughout the filtration system 130. The plurality of filtration system sensors may include pressure sensors and/or chemical sensors. The monitoring of the pressure changes across a respective filtration stage can be coincident with the monitoring of chemical sensing at the respective filtration stage. Also, the various sensors can be located between each filtration stage or between a subset of the filtration stages. Monitoring particulate filters to determine end-of-life due to the increase in delta-pressure across a stage may be rather easy, but it can be far more difficult to detect end-of-life of chemical filters.

Today, chemical saturation of filters is assessed at periodic running intervals to identify levels of chemical saturation and determine a regression curve in a given application that enables a relationship to be developed between the chemical saturation (or chemical capacity depletion) and time, which can be very site and route dependent due to the level of chemicals in the air varying (a) from application to application, (b) from site to site, (c) as wind direction and speed changes, (d) as routes in mines change, (e) based on the season (e.g., wet vs. dry), etc. For example, for each site, filters will be pulled after 250 hours to determine the chemical saturation level, then pulled at 500 hours, then 1000 hours, etc. to determine the rate of saturation at a given site. Such a process is done today for lack of a cost-effective ability to actively monitor the chemical saturation of filters in real-time. However, in applications that are very up-time sensitive from a total cost of ownership perspective (e.g., in mining, locomotive, marine), the cost threshold for detecting such an issue is much higher than other more cost-sensitive applications. Therefore, down-time costs and the impact of longevity of the fuel cell hybrid propulsion system 110 overwhelm the cost of implementing real-time chemical saturation diagnostics.

As shown in FIG. 5, the plurality of pressure sensors include (i) a first pressure sensor 140 positioned upstream of the first stage filter 132 to acquire first pressure data that facilitates monitoring the pressure of the incoming air, (ii) a second pressure sensor 142 positioned downstream of the first stage filter 132 and upstream of the second stage filter 134 to acquire second pressure data that facilitates monitoring the pressure of the filtered air between the first stage filter 132 and the second stage filter 134, (iii) a third pressure sensor 144 positioned downstream of the second stage filter 134 and upstream of the third stage filter 136 to acquire third pressure data that facilitates monitoring the pressure of the filtered air between the second stage filter 134 and the third stage filter 136, and (iv) a fourth pressure sensor 146 positioned downstream of the third stage filter 136 to acquire fourth pressure data that facilitates monitoring the pressure of the filtered air downstream of the third stage filter 136. In some embodiments, the filtration system 130 does not include one or more of the first pressure sensor 140, the second pressure sensor 142, the third pressure sensor 144, and the fourth pressure sensor 146 (e.g., the filtration system 130 does not include the fourth pressure sensor 146, etc.). The pressure sensors may be structured to monitor absolute pressures, differential pressures, and/or a different value indicative of a pressure. Accordingly, the pressure sensors may be structured as strain gauges, variable capacitance, solid-state, and so on.

As shown in FIG. 5, the plurality of chemical sensors include (i) a first chemical sensor 150 positioned upstream of the first stage filter 132 to acquire first chemical data that facilitates detecting the presence, quantity, and/or type of chemicals in the incoming air, (ii) a second chemical sensor 152 positioned downstream of the first stage filter 132 and upstream of the second stage filter 134 to acquire second chemical data that facilitates detecting the presence, quantity, and/or type of chemicals in the filtered air between the first stage filter 132 and the second stage filter 134, (iii) a third chemical sensor 154 positioned downstream of the second stage filter 134 and upstream of the third stage filter 136 to acquire third chemical data that facilitates detecting the presence, quantity, and/or type of chemicals in the filtered air between the second stage filter 134 and the third stage filter 136, and (iv) a fourth chemical sensor 156 positioned downstream of the third stage filter 136 to acquire fourth chemical data that facilitates detecting the presence, quantity, and/or type of chemicals in the filtered air downstream of the third stage filter 136. In some embodiments, the filtration system 130 does not include one or more of the first chemical sensor 150, the second chemical sensor 152, the third chemical sensor 154, and the fourth chemical sensor 156 (e.g., the filtration system 130 does not include the first chemical sensor 150, the second chemical sensor 152, and/or the fourth chemical sensor 156). The data acquired by the filtration system sensors may be used by the controller 200, as described in more detail herein.

In some embodiments, the first stage filter 132, the second filter stage filter 134, and the third stage filter 136 are packaged in a single filtration unit or as a single filtration device. In other embodiments, (a) the first stage filter 132 and the second stage filter 134 are packaged in a first filtration unit or as a first filtration device and (b) the third stage filter 136 is packaged in a second filtration unit or as a second filtration device (e.g., a "discontinuous" staged filtration system). By way of example, the first filtration unit or the first filtration device may be positioned at a first location (e.g., upstream of a humidifier for the fuel cell stack 122) and the second filtration unit or the second filtration device may be positioned at a second location (e.g., downstream of the humidifier for the fuel cell stack 122 just before an air inlet of the fuel cell stack 122). By way of another example, the first filtration unit or the first filtration device may perform both particulate and chemical filtration and the second filtration unit or the second filtration device may perform chemical filtration.

In some embodiments, the fuel cell assembly 120 additionally includes a second filtration assembly positioned between the hydrogen supply 124 and the fuel cell stack 122. The second filtration assembly may be structured to (i) receive hydrogen from the hydrogen supply 124 and (ii) provide filtered hydrogen to the fuel cell stack 122. The second filtration assembly may include one or more filters and/or one or more chemical sensors. The one or more filters may include a chemical catalyst to react with and/or neutralize various chemicals that may be present in impure hydrogen. By way of example, in some regions of the world, hydrogen supplies may have purity concerns. Therefore, the hydrogen can be passed through the second filtration assembly for purification prior to being provided to the fuel cell stack 122. In some embodiments, the hydrogen is selectively directed through the second filtration assembly in response to the one or more chemical sensors detecting impurities in the hydrogen, whereas pure or substantially pure hydrogen may be directed to bypass the second filtration assembly.

Figure 6:
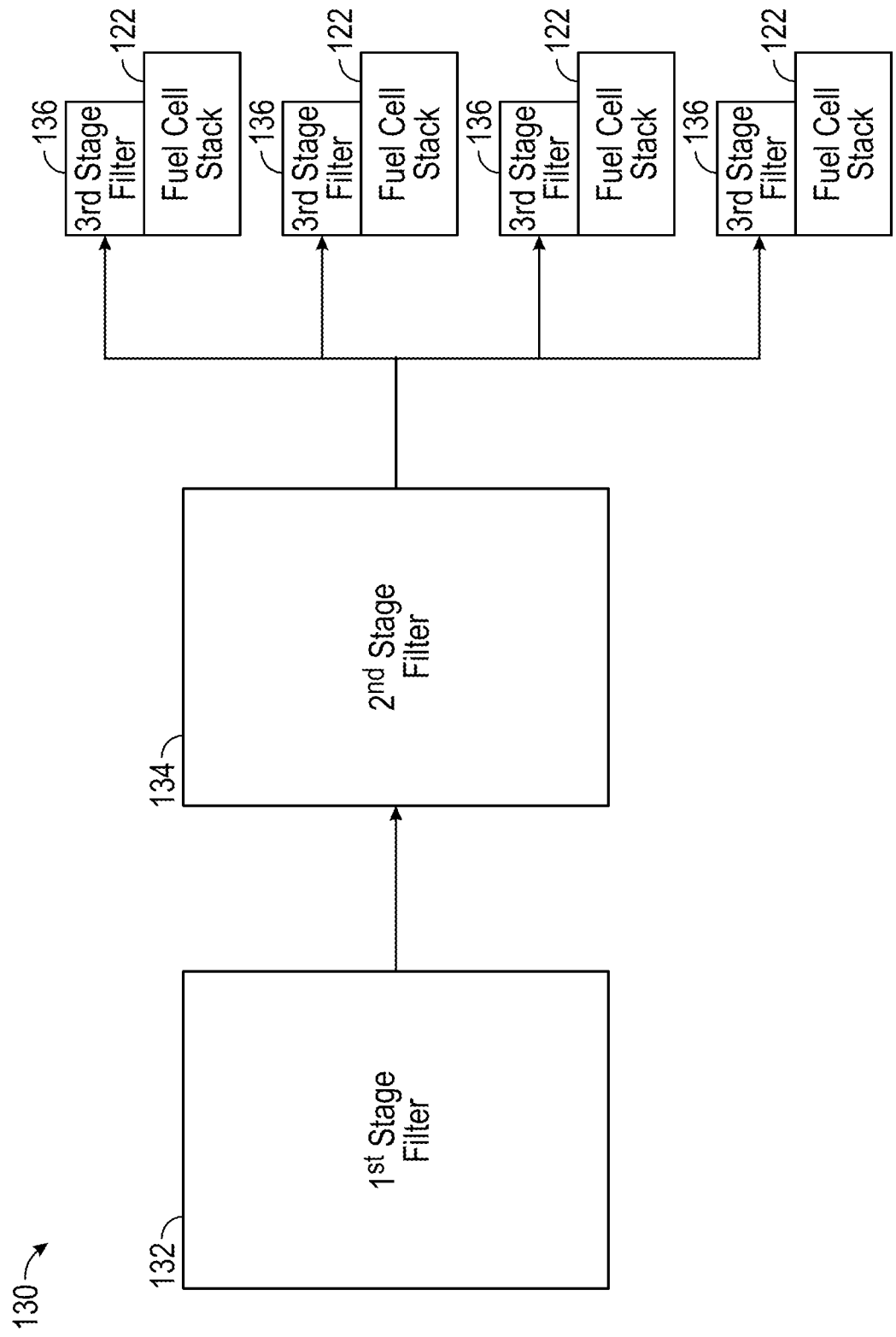
FIG. 6 is a schematic diagram of the filtration system of FIG. 2, according to another exemplary embodiment.

As shown in FIG. 6, the filtration system 130 is structured to filter air for a plurality of fuel cell stacks 122. Specifically, as shown in FIG. 6, the filtration system 130 includes the first stage filter 132, the second stage filter 134, and a plurality of third stage filters 136 where each of the plurality of third stage filters 136 is (i) in parallel with the first stage filter 132 and the second stage filter 134 and (ii) associated with a respective one of the plurality of fuel cell stacks 122. Therefore, the first stage filter 132 and the second stage filter 134 may be used to filter incoming air for a plurality of fuel cell stacks 122. While the various filtration system sensors described with respect to FIG. 5 are not shown in FIG. 6, it should be understood that such filtration system sensors could similarly be applied to the filtration system 130 shown in FIG. 6. Also, while the present disclosure has been described in the context of the vehicle 100, as indicated above, the fuel cell assembly 120 may be used in a power generation system (e.g., a generator set, etc.).

Figure 7:
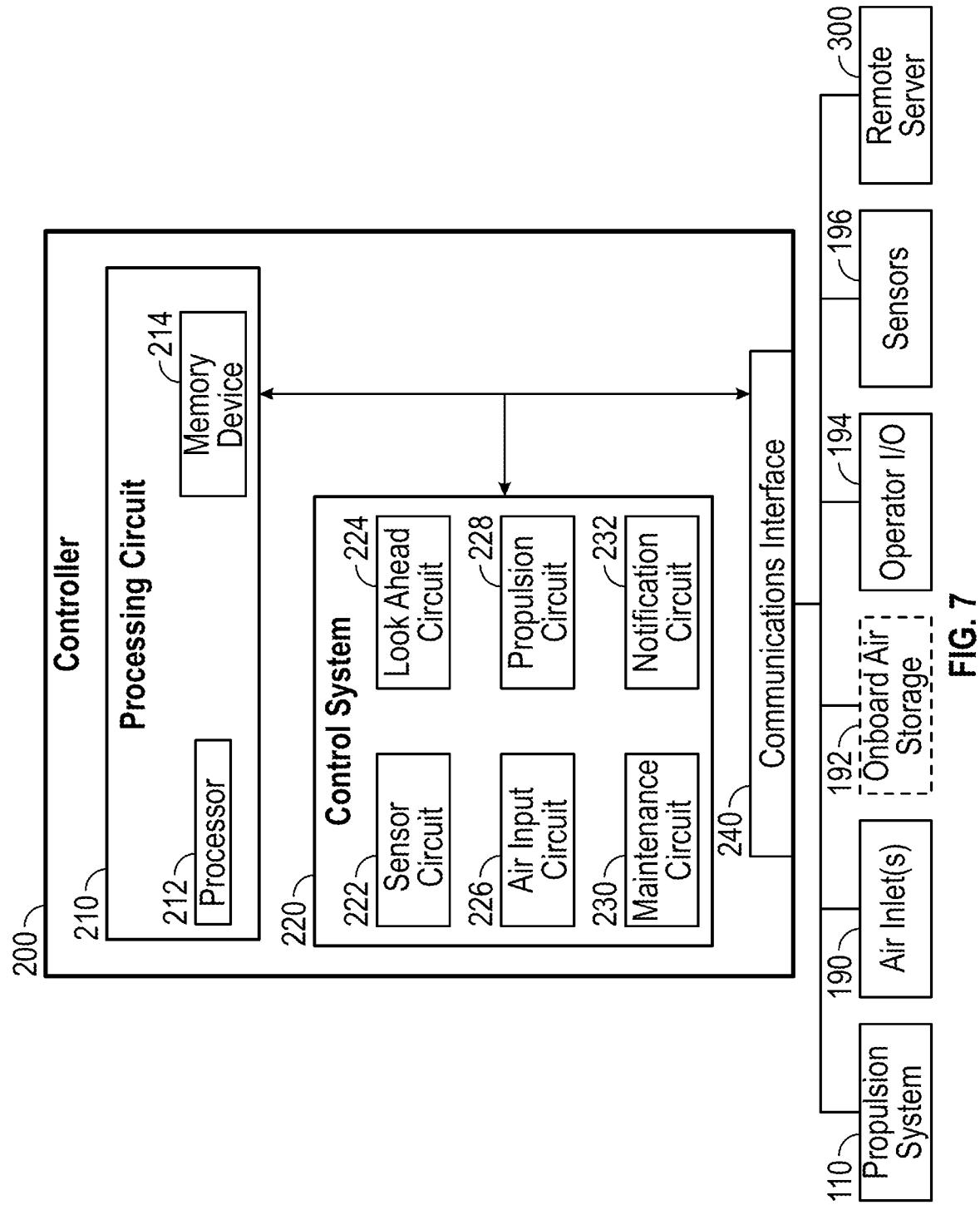
FIG. 7 is a schematic diagram of the controller of FIG. 1, according to an exemplary embodiment.

Referring now to FIG. 7, a schematic diagram of the controller 200 of the vehicle 100 of FIG. 1 is shown according to an example embodiment. As shown in FIG. 7, the controller 200 includes a processing circuit 210 having a processor 212 and a memory device 214; a control system 220 having a sensor circuit 222, a look ahead circuit 224, an air input circuit 226, a propulsion circuit 228, a maintenance circuit 230, and a notification circuit 232; and a communications interface 240. The communications interface 240 is structured to facilitate communication between the controller 200 and the fuel cell hybrid propulsion system 110, the air inlet(s) 190, the onboard air storage 192, the operator I/O 194, the sensors 196, and/or the remote server 300. Generally, the controller 200 is structured to monitor the data acquired from the sensors 196 and/or the remote server 300 and control various systems/components of the vehicle 100 based on the data, as described in more detail herein.

In one configuration, the sensor circuit 222, the look ahead circuit 224, the air input circuit 226, the propulsion circuit 228, the maintenance circuit 230, and the notification circuit 232 are embodied as machine or computer-readable media storing instructions that are executable by a processor, such as processor 212. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the sensor circuit 222, the look ahead circuit 224, the air input circuit 226, the propulsion circuit 228, the maintenance circuit 230, and the notification circuit 232 are embodied as hardware units, such as electronic control units. As such, the sensor circuit 222, the look ahead circuit 224, the air input circuit 226, the propulsion circuit 228, the maintenance circuit 230, and the notification circuit 232 may be embodied as one or more circuitry components including, but not limited to, processing circuitry, network interfaces, peripheral devices, input devices, output devices, sensors, etc. In some embodiments, the sensor circuit 222, the look ahead circuit 224, the air input circuit 226, the propulsion circuit 228, the maintenance circuit 230, and the notification circuit 232 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the sensor circuit 222, the look ahead circuit 224, the air input circuit 226, the propulsion circuit 228, the maintenance circuit 230, and the notification circuit 232 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The sensor circuit 222, the look ahead circuit 224, the air input circuit 226, the propulsion circuit 228, the maintenance circuit 230, and the notification circuit 232 may also include programmable hardware devices such as field programmable gate arrays, programmable array logic, programmable logic devices or the like. The sensor circuit 222, the look ahead circuit 224, the air input circuit 226, the propulsion circuit 228, the maintenance circuit 230, and the notification circuit 232 may include one or more memory devices for storing instructions that are executable by the processor(s) of the sensor circuit 222, the look ahead circuit 224, the air input circuit 226, the propulsion circuit 228, the maintenance circuit 230, and the notification circuit 232. The one or more memory devices and processor(s) may have the same definition as provided below with respect to the memory device 214 and the processor 212. In some hardware unit configurations, the sensor circuit 222, the look ahead circuit 224, the air input circuit 226, the propulsion circuit 228, the maintenance circuit 230, and the notification circuit 232 may be geographically dispersed throughout separate locations in the vehicle. Alternatively and as shown, the sensor circuit 222, the look ahead circuit 224, the air input circuit 226, the propulsion circuit 228, the maintenance circuit 230, and the notification circuit 232 may be embodied in or within a single unit/housing, which is shown as the controller 200.

In the example shown, the controller 200 includes the processing circuit 210 having the processor 212 and the memory device 214. The processing circuit 210 may be structured or configured to execute or implement the instructions, commands, and/or control processes described herein with respect to the sensor circuit 222, the look ahead circuit 224, the air input circuit 226, the propulsion circuit 228, the maintenance circuit 230, and the notification circuit 232. The depicted configuration represents the sensor circuit 222, the look ahead circuit 224, the air input circuit 226, the propulsion circuit 228, the maintenance circuit 230, and the notification circuit 232 as machine or computer-readable media. However, as mentioned above, this illustration is not meant to be limiting as the present disclosure contemplates other embodiments where the sensor circuit 222, the look ahead circuit 224, the air input circuit 226, the propulsion circuit 228, the maintenance circuit 230, and the notification circuit 232, or at least one circuit of the sensor circuit 222, the look ahead circuit 224, the air input circuit 226, the propulsion circuit 228, the maintenance circuit 230, and the notification circuit 232, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 212) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the sensor circuit 222, the look ahead circuit 224, the air input circuit 226, the propulsion circuit 228, the maintenance circuit 230, and the notification circuit 232 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 214 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 214 may be communicably connected to the processor 212 to provide computer code or instructions to the processor 212 for executing at least some of the processes described herein. Moreover, the memory device 214 may be or include tangible, non-transient volatile memory or non-volatile memory. Accordingly, the memory device 214 may include database components, object code components, script components, or any other type of information structure for supporting the various activities and information structures described herein.

The sensor circuit 222 is structured to (i) acquire or receive sensor data (e.g., pressure data, chemical data, air quality data, state of charge data, terrain data, etc.) from the sensors 196 and (ii) monitor external conditions around the vehicle 100 (e.g., chemicals in the air, pollutants in the air, debris/dirt in the air, air quality, upcoming terrain, etc.) and/or operational characteristics of components of the vehicle 100 based on the sensor data. By way of example, the operational characteristics may include the state of charge of the battery storage 160. By way of another example, the operational characteristics may include a pressure differential across one or more of the first stage filter 132, the second stage filter 134, and the third stage filter 136. By way of yet another example, the operational characteristics may include a presence, quantity, and/or type of chemicals upstream of, downstream of, and/or flowing across one or more of the first stage filter 132, the second stage filter 134, and the third stage filter 136.

The look ahead circuit 224 is structured to (i) acquire or receive look ahead data from the remote server 300 and (ii) monitor static external conditions ahead of the vehicle 100 (e.g., upcoming terrain such as a tunnel, a mine, a locomotive yard, etc.) and/or dynamic external conditions ahead of the vehicle 100 (e.g., upcoming air quality, etc.) based on the look ahead data (e.g., measured via external sensors, measured via sensors of vehicles ahead of the vehicle 100, static terrain characteristics pre-loaded into the remote server 300, based on geofencing, etc.).

The air input circuit 226 is structured to control the supply of air/oxygen provided by the air inlet(s) 190 and/or the onboard air storage 192 to the filtration system 130 and/or the fuel cell assembly 120 based on the sensor data and/or the look ahead data. By way of example, the air input circuit 226 may be structured to open and close respective air inlets 190 based on the sensor data and/or the look ahead data. For example, (i) a first air inlet 190 may be selectively closed or restricted (e.g., via a valve, a movable baffle or shutter, etc.) based on indications of poor air quality (e.g., quality less than a desired air quality threshold) upcoming, proximate, or entering the first air inlet 190 to prevent dirty ambient air from entering the filtration system 130 and the fuel cell assembly 120 and (ii) a second air inlet 190 may be opened or left open based on indications of clean air or good air quality (e.g., quality greater than the desired air quality threshold) upcoming, proximate, or entering the second air inlet 190.

By way of another example, the air input circuit 226 may be structured to close or restrict the air inlet(s) 190 and switch to providing air/oxygen to the fuel cell assembly 120 via the onboard air storage 192 (e.g., if included with the vehicle 100, if the onboard air storage 192 has sufficient air/oxygen charge, etc.) based on the sensor data and/or the look ahead data indicating dirty air or poor air quality (e.g., quality less than a desired air quality threshold) is upcoming, proximate the vehicle 100, or entering the filtration system 130. For example, (i) the air inlet(s) 190 may be selectively closed or restricted to prevent dirty ambient air from entering the filtration system 130 and the fuel cell assembly 120 and (ii) the onboard air storage 192 may be activated to provide clean air/oxygen to the filtration system 130 and/or the fuel cell assembly 120 (e.g., until the vehicle 100 is clear of the dirty air, until the onboard air storage 192 runs out of air/oxygen, etc.). Such a situation may arise, for example, when a train is coming up on a tunnel that is known to have chemical debris in it, and to preserve the life of the filtration system 130 and the fuel cell stack 122, the air input circuit 226 can utilize "look ahead" technology and geo-fencing capabilities to "turn-off" the fuel cell assembly 120 (e.g., by closing the air inlet(s) 190), or changing the source of oxygen (e.g., to the onboard air storage 192) (e.g., the system may operate on EV-only (or, batteries only)).

The propulsion circuit 228 is structured to control the fuel cell hybrid propulsion system 110, at least parts thereof. By way of example, the propulsion circuit 228 may be structured to switch the fuel cell hybrid propulsion system 110 from (i) a fuel cell power generation mode where the fuel cell assembly 120 generates electricity for use by the vehicle 100 (e.g., to charge the battery storage 160, to power the electric motor(s) 170, etc.) to (ii) an electric only mode where the battery storage 160 is not charged by the fuel cell assembly 120 and the electric motor(s) 170 are not powered by the fuel cell assembly 120, but rather the electric motor(s) 170 are powered by the stored energy in the battery storage 160. The propulsion circuit 228 may be structured to switch from the fuel cell power generation mode to the electric only mode in response to (i) the air inlet(s) 190 being closed or restricted, (ii) the onboard air storage 192 being empty (if included in with the vehicle 100), and/or (iii) the fuel cell assembly 120 being deactivated or turned off. The propulsion circuit 228 may be structured to revert back to the fuel cell power generation mode in response to (i) external conditions permitting opening of the air inlet(s) 190 (e.g., air quality improving) and/or operation of the fuel cell assembly 120 being reinstated and/or (ii) the battery storage 160 becoming sufficiently depleted (e.g., the state of charge thereof falling below a state of charge threshold).

By way of another example, the propulsion circuit 228 may be structured to derate operation of the fuel cell hybrid propulsion system 110 (i) during poor air quality conditions, (ii) if the filtration system 130 reaches a plugged or saturation condition (e.g., plugged with debris beyond a predefined amount, which may be based on a flow rate being at or below a predefined level or threshold that indicates a reduced flow and a potential plugged situation, or a pressure or pressure differential in the filtration system meeting or exceeding a predefined threshold that indicates a backpressure and a potential plugged condition, and/or another process; chemically saturated; prior to the third stage filter 136 becoming breached, plugged, or saturated; etc.), (iii) if operation using the onboard air storage 192 is not presently possible, and/or (iv) if the electric only mode of operation is not presently possible to reduce the amount of external air consumed by the fuel cell assembly 120 and, thereby, reduce the amount of debris and/or chemicals that needs to be filtered by the filtration system 130.

By way of yet another example, the propulsion circuit 228 may be structured to redefine the distribution of power supplied to the electric motor(s) 170 from the fuel cell assembly 120 and the battery storage 160 based on current air quality and current fuel cell efficiency. As one example, as the efficiency of the fuel cell assembly 120 decreases over time, the propulsion circuit 228 may be structured to provide blended power from the fuel cell assembly 120 and the battery storage 160 such that (i) more or an increasing amount of power is provided to the electric motor(s) 170 from the battery storage 160 and (ii) less or a reducing amount of power is generated by the fuel cell assembly 120 and provided to the electric motor(s) 170 from the fuel cell assembly 120. As another example, as the current air quality decreases, the propulsion circuit 228 may be structured to provide blended power from the fuel cell assembly 120 and the battery storage 160 such that (i) more or an increasing amount of power is provided to the electric motor(s) 170 from the battery storage 160 and (ii) less or a reducing amount of power is generated by the fuel cell assembly 120 and provided to the electric motor(s) 170 from the fuel cell assembly 120. Therefore, the blended power provided to the electric motor(s) 170 may vary as a function of current air quality and current efficiency of the fuel cell assembly 120.

The maintenance circuit 230 is structured to (i) monitor the sensor data acquired by the sensors 196 and (ii) determine when maintenance of the filtration system 130 may be needed. By way of example, the maintenance circuit 230 may be structured to determine that maintenance of the filtration system 130 is needed in response to (i) a first differential pressure across the first stage filter 132 reaching a first pressure differential threshold (i.e., sufficiently plugged), (ii) a second differential pressure across the second stage filter 134 reaching a second pressure differential threshold (i.e., sufficiently plugged), and/or (iii) a third differential pressure across the third stage filter 136 reaching a third pressure differential threshold (i.e., sufficiently plugged). By way of another example, the maintenance circuit 230 may be structured to determine that maintenance of the filtration system 130 is needed in response to (i) detecting a first presence, quantity, and/or type of chemicals downstream of the first stage filter 132 (i.e., chemically saturated), (ii) detecting a second presence, quantity, and/or type of chemicals downstream of the second stage filter 134 (i.e., chemically saturated), and/or (iii) detecting a third presence, quantity, and/or type of chemicals downstream of the third stage filter 136 (i.e., chemically saturated). By way of example, chemical saturation may be detected by detecting any presence of specific types of chemical constituents. By way of another example, chemical saturation may be detected by comparing a quantity of specific types of chemical constituents to an acceptable threshold for specific chemical constituents. By way of yet another example, chemical saturation may be detected by comparing a rate of change of a quantity of specific types of chemicals to an acceptable rate of change threshold for specific types of chemical constituents.

In some embodiments, the maintenance circuit 230 is structured to predict when maintenance of the filtration system 130 may be needed and plan maintenance events based on the prediction. By way of example, the maintenance circuit 230 may be structured to predict future maintenance of the filtration system 130 based on (i) a first rate of change of the first differential pressure across the first stage filter 132 (i.e., a first rate of plugging), (ii) a second rate of change of the second differential pressure across the second stage filter 134 (i.e., a second rate of plugging), and/or (iii) a third rate of change of the third differential pressure across the third stage filter 136 (i.e., a third rate of plugging) relative to one or more rate of change thresholds or values which may be stored by the controller 200 and/or periodically received from the remote server 300. For example, the maintenance circuit 230 may (i) predict and plan for earlier maintenance in response to a higher or increased rate of plugging of the first stage filter 132, the second stage filter 134, and/or the third stage filter 136 or (ii) predict and plan for later maintenance in response to a lower or reduced rate of plugging of the first stage filter 132, the second stage filter 134, and/or the third stage filter 136.

The notification circuit 232 is structured to provide notifications to operators, fleet managers/dispatchers, and/or maintenance personnel via the operator I/O 194 and/or the remote server 300 based on the determinations made by the maintenance circuit 230. By way of example, the notification circuit 232 may be structured to control the operator I/O 194 (e.g., a warning lamp/indicator, a display, etc. within a cab of the vehicle 100) to notify an operator of the vehicle 100 that maintenance of the filtration system 130 is currently needed or may soon be needed (e.g., a first notification that one or more filters are sufficiently plugged, a second notification that one or more of the filters are chemically saturated). By way of another example, the notification circuit 232 may be structured to transmit a signal to the remote server 300 to notify fleet managers/dispatchers of the vehicle 100 that maintenance of the filtration system 130 is currently needed or may soon be needed (e.g., so that they can take the vehicle 100 out of commission for maintenance). By way of still another example, the notification circuit 232 may be structured to transmit a signal to the remote server 300 to schedule maintenance of the filtration system 130 and notify fleet managers/dispatchers and/or maintenance personnel of the upcoming scheduled maintenance event.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 7, it should be understood that the controller 200 may include any number of circuits for completing the functions described herein. For example, the activities and functionalities of the sensor circuit 222, the look ahead circuit 224, the air input circuit 226, the propulsion circuit 228, the maintenance circuit 230, and the notification circuit 232 may be combined in multiple circuits or as a single circuit. Additional circuits with additional functionality may also be included. Further, the controller 200 may further control other activity beyond the scope of the present disclosure.

As mentioned above and in one configuration, the "circuits" may be implemented in machine-readable medium for execution by various types of processors, such as the processor 212 of FIG. 7. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle system 10, the vehicle 100, and the subsystems of the vehicle 100 (e.g., the fuel cell hybrid propulsion system 110, the fuel cell assembly 120, the filtration system 130, etc.) as shown in the various exemplary embodiments is illustrative only. Additionally, any element disclosed in one embodiment may be incorporated or utilized with any other embodiment disclosed herein. For example, the sensors 196 and the magnetic device 138 of the exemplary embodiment described in at least paragraph [0030]-[0032] may be incorporated in the filtration system 130 of the exemplary embodiment described in at least paragraph [0033]. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A system for a machine having a fuel cell hybrid propulsion system, the system comprising:
 a filtration assembly including:
  a first stage filter having first pores with a first mean pore size;
  a second stage filter positioned downstream of the first stage filter, the second stage filter having second pores with a second mean pore size; and
  a third stage filter positioned downstream of the second stage filter and configured to be positioned upstream of a fuel cell assembly, the third stage filter having third pores with a third mean pore size, wherein the second mean pore size is less than the first mean pore size, and wherein the third mean pore size is less than or equal to the second mean pore size, and wherein the first stage filter, the second stage filter, and the third stage filter are structured to filter an airflow prior to being received by the fuel cell assembly;
 a plurality of pressure sensors positioned to acquire pressure data regarding a pressure differential across at least one of the first stage filter or the second stage filter;
 one or more chemical sensors positioned to acquire chemical data regarding at least one of a presence, a quantity, or a type of chemical downstream of at least one of the first stage filter or the second stage filter; and
 a controller having programmed instructions to:
  monitor the pressure data and the chemical data;
  provide a first notification in response to the pressure data indicating that at least one of the first stage filter or the second stage filter is in a plugged condition; and
  provide a second notification in response to the chemical data indicating that at least one of the first stage filter or the second stage filter is chemically saturated.

2. The system of claim 1, wherein the one or more chemical sensors includes a single chemical sensor positioned downstream of the second stage filter and upstream of the third stage filter, and wherein the controller has programmed instructions to provide the second notification in response to the chemical data indicating that the second stage filter is chemically saturated.

3. The system of claim 1, wherein each of the first stage filter and the second stage filter includes a chemical catalyst that reacts with one or more chemicals, wherein the one or more chemical sensors includes (i) a first chemical sensor positioned downstream of the first stage filter and upstream of the second stage filter and (ii) a second chemical sensor positioned downstream of the second stage filter and upstream of the third stage filter, wherein the chemical data includes (i) first chemical data regarding at least one of a first presence, a first quantity, or a first type of chemical downstream of the first stage filter and (ii) second chemical data regarding at least one of a second presence, a second quantity, or a second type of chemical downstream of the second stage filter, and wherein the controller has programmed instructions to:
 provide the second notification in response to the first chemical data indicating that the first stage filter is chemically saturated; and
 provide the second notification in response to the second chemical data indicating that the second stage filter is chemically saturated.

4. The system of claim 1, wherein the pressure data includes first pressure data regarding a first pressure differential across the first stage filter and second pressure data regarding a second pressure differential across the second stage filter, and wherein the controller has programmed instructions to:
provide the first notification in response to the first pressure data indicating that the first stage filter is in the plugged condition; and
provide the first notification in response to the second pressure data indicating that the second stage filter is in the plugged condition.

5. The system of claim 1, wherein the third stage filter includes a plurality of third stage filters in parallel with the first stage filter and the second stage filter, and wherein each of the plurality of third stage filters is configured to be associated with a respective fuel cell stack of the fuel cell assembly.

6. The system of claim 1, wherein the filtration assembly includes a magnetic device positioned upstream of the first stage filter.

7. The system of claim 1, wherein the first mean pore size is between 30 and 50 microns, and wherein the second mean pore size is between 5 and 15 microns.

8. The system of claim 1, further comprising a plurality of air inlets positioned upstream of the first stage filter, wherein each of the plurality of air inlets is independently and selectively closable or restrictable.

9. The system of claim 8, wherein the controller has programmed instructions to:
acquire air quality data regarding an air quality of air upcoming, proximate, or entering the plurality of air inlets;
close or restrict a first air inlet of the plurality of air inlets in response to the air quality data indicating that the air upcoming, proximate, or entering the first air inlet is of a quality lower than a quality threshold to prevent dirty ambient air from entering the filtration assembly; and
open or keep open a second air inlet of the plurality of air inlets in response to the air quality data indicating that the air upcoming, proximate, or entering the second air inlet is of a quality greater than the quality threshold.

10. The system of claim 1, further comprising:
an air inlet positioned upstream of the first stage filter that is selectively closable or restrictable; and
a battery configured to provide power to an electric motor of the machine when the air inlet is closed or restricted and to restrict an ability of the fuel cell assembly in generating electricity.

11. The system of claim 10, wherein the controller has programmed instructions to transition from (i) a fuel cell power generation mode where the fuel cell assembly generates the electricity for use by the machine to (ii) an electric only mode where the battery is not charged by the fuel cell assembly and the electric motor is not powered by the fuel cell assembly, but rather the electric motor is powered by stored energy in the battery.

12. The system of claim 11, wherein the controller has programmed instructions to switch from the fuel cell power generation mode to the electric only mode in response to at least one of (i) the air inlet being closed or restricted, (ii) an onboard air storage of the machine being empty, or (iii) the fuel cell assembly being deactivated or turned off (a) due to air quality conditions or (b) if the filtration assembly reaches a plugged or chemical saturation condition.

13. The system of claim 12, further comprising the onboard air storage configured to store an air supply and facilitate selectively providing the air supply to the filtration assembly or the fuel cell assembly when not empty and when the air inlet is closed or restricted.

14. The system of claim 1, further comprising:
an air inlet positioned upstream of the first stage filter that is selectively closable or restrictable; and
an onboard air storage configured to store an air supply and facilitate selectively providing the air supply to the filtration assembly or the fuel cell assembly when the air inlet is closed or restricted.

15. The system of claim 14, wherein the controller has programmed instructions to:
acquire air quality data regarding an air quality of air upcoming, proximate, or entering the air inlet;
close or restrict the air inlet in response to the air quality data indicating that the air upcoming, proximate, or entering the air inlet is of a quality lower than a quality threshold to prevent dirty ambient air from entering the filtration assembly; and
activate the onboard air storage to provide the air supply to the filtration assembly or the fuel cell assembly when the air inlet is closed or restricted.

16. The system of claim 1, wherein the controller has programmed instructions to derate operation of the fuel cell assembly based on at least one of: (i) predefined air quality conditions, (ii) the filtration assembly reaching a plugged or chemical saturation condition, (iii) using an onboard air storage of the machine is not presently possible, or (iv) if an electric only mode of operation for the machine using energy from a battery of the machine is not presently possible.

17. A system for a machine having a fuel cell hybrid propulsion system, the system comprising:
a filtration assembly including a plurality of filter stages including at least a first stage filter having a first mean pore size and a second stage filter having a second mean pore size less than the first mean pore size, at least one of the first stage filter or the second stage filter includes a chemical catalyst that reacts with one or more chemicals;
a plurality of pressure sensors positioned to acquire pressure data regarding a first pressure differential across the first stage filter and a second pressure differential across the second stage filter;
one or more chemical sensors positioned to acquire chemical data regarding a chemical downstream of at least one of the first stage filter or the second stage filter; and
a controller having programmed instructions to:
monitor the pressure data and the chemical data;
provide a first notification in response to the first pressure differential indicating that the first stage filter is in a plugged condition;
provide a second notification in response to the second pressure differential indicating that the second stage filter is in the plugged condition; and
provide a third notification in response to the chemical data indicating that the chemical catalyst is chemically saturated.

18. The system of claim 17, wherein the plurality of filter stages includes a third stage filter positioned downstream of the second stage filter and configured to be positioned upstream of a fuel cell assembly, the third stage filter having a third mean pore size less than or equal to the second mean pore size.

19. A system comprising:
a filtration assembly configured to be positioned upstream of a fuel cell assembly, the filtration assembly including a plurality of filter stages;
an air inlet positioned upstream of the filtration assembly, the air inlet is selectively closable or restrictable;
an onboard air storage configured to store an air supply and facilitate selectively providing the air supply to the filtration assembly or the fuel cell assembly;
a controller having programmed instructions to:
  acquire air quality data regarding an air quality of air upcoming, proximate, or entering the air inlet;
  close or restrict the air inlet in response to the air quality data indicating that the air upcoming, proximate, or entering the air inlet is of a quality lower than a quality threshold to prevent dirty ambient air from entering the filtration assembly;
  activate the onboard air storage to provide the air supply to the filtration assembly or the fuel cell assembly when the air inlet is closed or restricted; and
  provide power to an electric motor using a battery when the air inlet is closed or restricted and the onboard air storage is below a predefined threshold.

20. The system of claim 19, further comprising:

a plurality of pressure sensors positioned to acquire pressure data regarding a pressure differential across at least one stage of the plurality of filter stages, wherein the controller has programmed instructions to monitor the pressure data and provide a first notification in response to the pressure data indicating that the at least one stage is in a plugged condition; and one or more chemical sensors positioned to acquire chemical data regarding a chemical downstream of at least one stage of the plurality of filter stages, wherein the controller has programmed instructions to monitor the chemical data and provide a second notification in response to the chemical data indicating that the at least one stage is chemically saturated.

* * * * *